(12) United States Patent
Crawford, III

(10) Patent No.: US 10,596,778 B2
(45) Date of Patent: Mar. 24, 2020

(54) FIBER-REINFORCED COMPOSITE MATERIAL

(71) Applicant: Howard E. Crawford, III, Portland, OR (US)

(72) Inventor: Howard E. Crawford, III, Portland, OR (US)

(73) Assignee: Howard E. Crawford, III, Beijing (CN)

( * ) Notice: Subject to any disclaimer, the term of this patent is extended or adjusted under 35 U.S.C. 154(b) by 359 days.

(21) Appl. No.: 14/685,407

(22) Filed: Apr. 13, 2015

(65) Prior Publication Data

US 2016/0297167 A1    Oct. 13, 2016

(51) Int. Cl.
| | | |
|---|---|---|
| *B32B 3/24* | (2006.01) |
| *B32B 3/26* | (2006.01) |
| *B32B 27/06* | (2006.01) |
| *B26D 3/00* | (2006.01) |
| *B29C 41/50* | (2006.01) |
| *B32B 5/28* | (2006.01) |
| *B32B 5/02* | (2006.01) |
| *B32B 5/12* | (2006.01) |
| *B32B 27/04* | (2006.01) |

(52) U.S. Cl.
CPC .............. *B32B 3/266* (2013.01); *B26D 3/006* (2013.01); *B29C 41/50* (2013.01); *B32B 5/02* (2013.01); *B32B 5/12* (2013.01); *B32B 5/28* (2013.01); *B32B 27/04* (2013.01); *B32B 27/06* (2013.01); *B32B 2260/023* (2013.01); *B32B 2260/046* (2013.01); *B32B 2262/0269* (2013.01); *B32B 2262/101* (2013.01); *B32B 2262/106* (2013.01); *Y10T 428/24314* (2015.01)

(58) Field of Classification Search
CPC ..................... B32B 3/266; Y10T 428/24314
See application file for complete search history.

(56) References Cited

U.S. PATENT DOCUMENTS

| | | | |
|---|---|---|---|
| 5,604,020 A | 2/1997 | Fitchmun | |
| 2013/0095282 A1* | 4/2013 | Taketa | B29C 43/222 428/113 |
| 2014/0186600 A1 | 7/2014 | Dyksterhouse | |

FOREIGN PATENT DOCUMENTS

| | | | | |
|---|---|---|---|---|
| EP | 2127840 A1 | | 12/2009 | |
| JP | 63247012 A | * | 10/1988 | ............. B32B 3/266 |
| WO | 2014/142061 A1 | | 9/2014 | |

OTHER PUBLICATIONS

Application as filed Feb. 18, 2016, PCT/US2016/024378, 53 pages.
International Search Report and Written Opinion, PCT/US2016/024378, dated Jun. 13, 2016, 16 pages.
PCT/US2016/024378, IPRP, mailed Oct. 26, 2017, 7 pages.
Li, et al, "Mechanical Properties of Undirectional Arrayed Chopped Strands (UACS) with Different Slit Patterns," 18th International Conference on Composite Materials, Aug. 2011, 6 Pages.
Machine English translation of Japanese patent 63247012 (Kishi, et al., published Oct. 13, 1988) from JPlatPat (Japan Patent Office) website. 7 pages.
Taketa, et al, "A new compression-molding approach using unidirectionally arrayed chopped strands," Elsevier, Composites Part A 39, 2008, pp. 1884-1890.

(Continued)

*Primary Examiner* — William P Watkins, III
(74) *Attorney, Agent, or Firm* — Berkeley Law & Technology Group, LLP

(57) ABSTRACT

Briefly, a variety of embodiments of composite materials including part fabrication using composite materials is described.

30 Claims, 11 Drawing Sheets

(56) References Cited

OTHER PUBLICATIONS

Hira, et al, "Effect of the Pattern of Fine Cut Group to Prepreg on the Formability and Strength of Thermoplastice Matrix CFRP," SAMPE Conference Proceedings, Seattle, WA, Jun. 2-5, 2014, Copyright 2014, 10 Pages.

Black, "Aligned discontinuous fibers come of age," http://www.compositesworld.com/, Oct. 5, 2014, 6 Pages.

Ryder, "Affordable Prepreg Solutions for the Automotive Market," umeco, Meet the Engineer Automotive Council UK, May 15, 2012, 6 Pages.

Stack, et al, "Development in Thermoforming Thermoplastic Composites," University of Massachusetts Lowel, 2013, 18 Pages.

Olofsson, et al, "Automated Cutting of Fiber Materials for Tailored Drapeability," Event (Conference etc) Swedish Production Symposium, Nov. 6, 2012-Nov. 8, 2012, Linkoping Sweden, 7 Pages.

Nguyen, et al, "Fast-Cycle CFRP Manufacturing Technologies for Automobile Applications," Toray Industries, Inc. Nihonbashi Mitsui Tower, 1-1, Nihonbashi-Muromachi 2-chome, Chuo-ku, Tokyo 103-8666, Japan, 2012, 6 Pages.

Cytec, "Manufactureing of composite tooling using Dform deformable composite system," TD1023_08.13_Issue3a, Copyright 2012, 5 Pages.

Wang, et al, "New Unidirectionally Arrayed Chopped Strands Composites by Introducing Discontinuous Angled Slits into Prepreg," ECCM15—15th European Conference on Composite Materials, Venice, Italy, Jun. 24, 2012-Jun. 28, 2012, 8 Pages.

Pepin Associates, Inc., "The Promise of Fiber Reinforced Thermoplastics: Pepin Associates' DiscoTex Enables Lightweight, Recyclable Parts," Pepin Associates, Inc., PO Box 397, Greenville, ME 04441, http://www.pepinassociates.com/Home.html, Press Release Jun. 14, 2011, 3 Pages.

\* cited by examiner

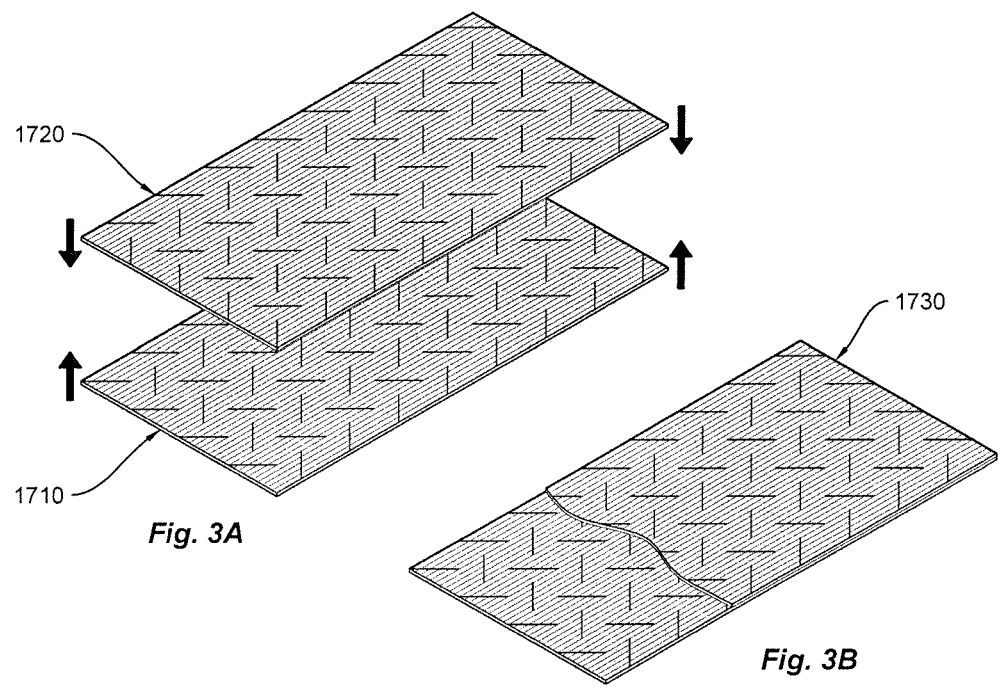
Fig. 3A
Fig. 3B
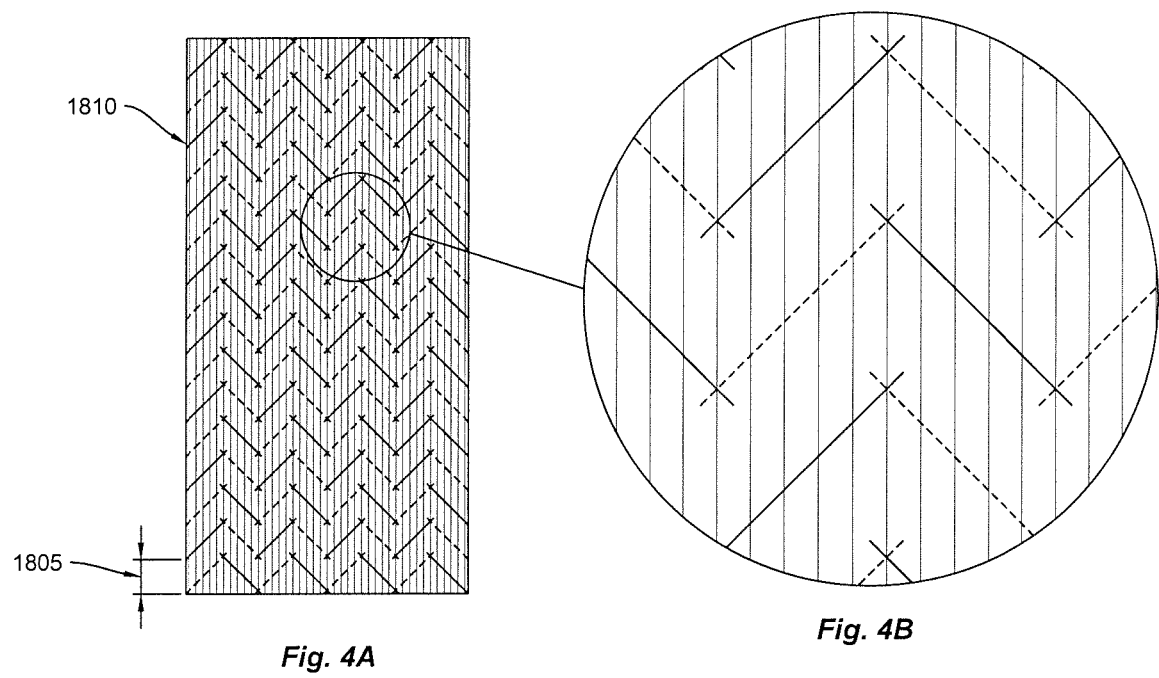
Fig. 4A
Fig. 4B

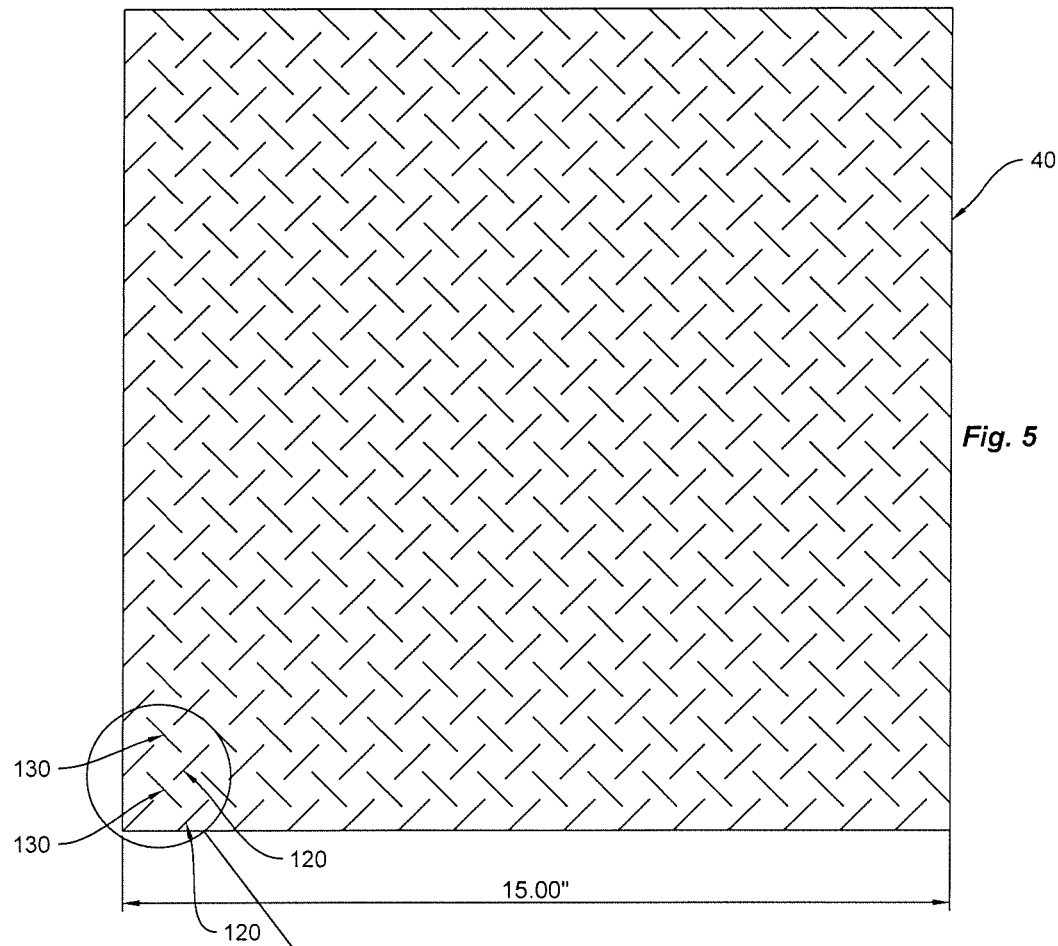
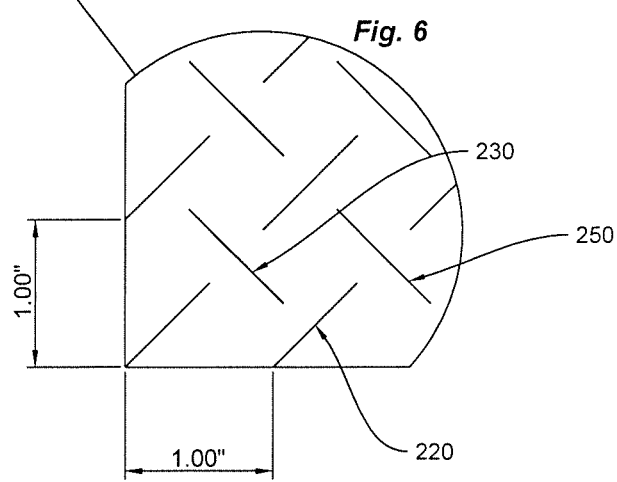

FIBER-REINFORCED COMPOSITE MATERIAL

BACKGROUND

1. Field

This disclosure relates to composite material and/or fabricating parts from composite materials.

2. Information

In a variety of industries, parts are fabricated using composite materials. However, doing so may involve a variety of trade-offs. For example, fabrication using composite materials of adequate strength for some uses, such as for complex parts, may be challenging without significant amounts of labor, which may add cost, and/or may simply not be feasible.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 3A and 3B are illustrations, shown in isometric view, of the embodiments of FIG. 2 used to form an embodiment of a panel of composite sheets;

FIGS. 4A and 4B are illustrations, shown in plan view, of the embodiment of a panel of FIG. 3;

FIG. 5 is a plan view a discontinuous fiber reinforced sheet, such those shown in FIG. 2.

FIG. 6 is a detailed view of a section of FIG. 5;

Figure 1:
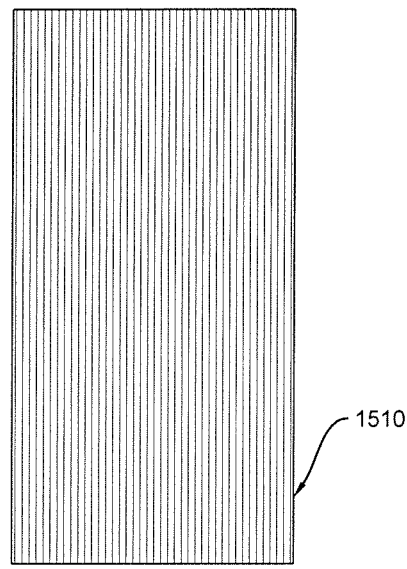
FIG. 1 is an illustration, shown in plan view, of an embodiment of a sheet of continuous fiber reinforced composite material.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment described. Furthermore, it is to be understood that particular features, structures, and/or characteristics described are capable of being combined in various ways in one or more implementations and/or embodiments and, therefore, are within intended claim scope, for example. In general, of course, these and other issues vary with context. Therefore, particular context of description and/or usage provides helpful guidance regarding inferences to be drawn.

Likewise, in this context, the term contact or physical contact is used generically to indicate that two or more components, such as sheets, for example, are in direct physical contact or are in indirect physical contact. Indirect physical contact refers to physical contact that includes a physical intermediary, for example, in an appropriate context. Thus, as an example, two sheets may be in physical contact in this context, albeit indirect physical contact, in a situation in which a third sheet is between the two sheets, so that one of the two sheets is in direct physical contact with one side of the third sheet and the other of the two sheets is in direct physical contact with the other side of the third sheet.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

The term composite in this context refers to a material made from more than one constituent material. Typically, there are at least two types of constituent materials: a matrix-type material and a reinforcement-type material. Thus, in this context, the term composite, such as with reference to a composite material, refers to a material employing constituents with at least a portion of these previously mentioned respective types.

Typically, one or more matrix materials surround and/or support one or more reinforcement materials, such as by maintaining relative positions at least to a degree. One or more reinforcement materials typically provide mechanical and/or physical properties. A combination of matrix and reinforcement materials typically produces a material having a set of desired properties unavailable from the constituents individually.

Fabrication of a part usually includes imparting a shape to the part to be fabricated. A matrix material, for example, typically experiences a melding event, after which part shape may be largely set. A melding event may occur in various ways, such as by chemical polymerization and/or solidification from a melted state. Likewise, a matrix material may be introduced to a reinforcement material before or after the reinforcement material is placed into a cavity or onto a surface, for example, during fabrication.

A variety of methods is available for fabrication and may vary depending at least in part on end-product objectives. Thus, a variety of factors may be considered. As an illustrative and a non-limiting example, properties of one or more matrix and/or one or more reinforcement materials in combination and/or individually typically may be included among a variety of factors to be considered. Likewise, gross quantity of parts to be produced may be included among a variety of factors to be considered in some cases, which may, likewise, at least partially affect cost. Thus, cost may be included among a variety of factors to be considered.

Often composites use a polymer matrix material. There are many different polymers available. More commonly employed polymers include polyester, vinyl ester, epoxy, phenolic, polyimide, polyamide, polypropylene, PEEK, combinations thereof and/or others. A reinforcement material may comprise a fiber, although others are known as well, as discussed more below. Types of polymer commonly used respectively comprise thermosets, thermoplastics, and/or combinations thereof. Examples of thermosets respectively include unsaturated polyesters, vinylesters, epoxies, phenolics, polyurethanes, and/or combinations thereof.

Thermosets (also referred to as thermoset resins) employ a curing agent. Thus, as an illustration, impregnation with respect to a reinforcing material, followed by curing, may be employed to fabricate a part using a thermoset. Curing thus typically sets shape of the part if employing a thermoset matrix material. In general, epoxies are commonly used in industry. Typically these are relatively high-viscosity liquids. A curing agent is employed to affect reaction rate and may also affect performance characteristics of a part being fabricated. Some more commonly used curing agents comprise: methyl ethyl ketone peroxide (MEKP), methylenedianiline (MDA) or, sulfonyldianiline (DDS). MEKP, for example, is commonly used for polyester or vinylester.

Thermoplastic refers to a polymer material that becomes pliable or moldable above a specific temperature and solidifies as a result of cooling. Thermoplastics typically have a high molecular weight. Polymer chains associate through intermolecular forces, which weaken rapidly with increased temperature and/or pressure, yielding a viscous liquid. Thus, thermoplastics may be reshaped using heat and/or pressure and are typically used to produce parts by injection molding and/or similar processes. Thermoplastics differ from thermosetting polymers, which form irreversible chemical bonds during a curing process.

Thus, thermoplastics are typically employed initially as nonreactive solids (e.g., typically no chemical reaction occurs during processing/fabrication). Heat and/or pressure may instead be employed to form a part. Unlike thermosets, thermoplastics (also referred to as thermoplastic resins) usually are able to be reheated and reformed into another shape, if desired.

Figure 15:
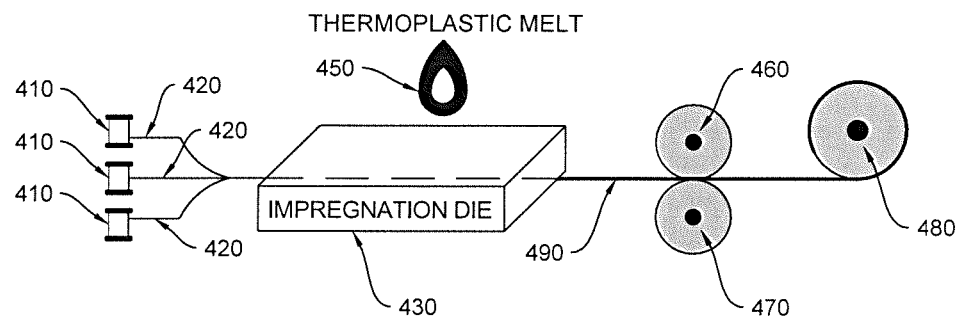

Thus, examples of possible matrix and/or reinforcement materials, without intending to be exhaustive, include:

Thermoplastic Resins:
Polypropylene (PP)
Polyethylene (PE)
Polyethylene terephthalate (PET)
Polyamide 6 (Nylon 6)
Polyamide 66 (Nylon 66)
Rigid Thermoplastic Polyurethane (TPU)
Polycarbonate (PC)
Polycarbonate/Acrylonitrile butadiene styrene (PC/ABS)
PVDF—Polyvinylidene fluoride
Polyphenylene sulfide (PPS)
Polyether ether ketone (PEEK)
Fibers:
Glass (E-glass)
Glass (S-Glass)
Carbon/Graphite (standard modulus)
Carbon/Graphite (intermediate modulus)
Carbon/Graphite (ultra-high modulus)
Aramid (high toughness)
Aramid (high modulus)
Aramid (ultra-high modulus)
Basalt
Bamboo
Wood Referring to FIG. 15, as an example, to produce a composite material, fiber roving 420, such as E-glass 420, may be passed through an impregnation die 430. For example, fibers may be introduced where they may be impregnated with thermoplastic resin. For example, as fibers pass through impregnation die 430, they may contact a thermoplastic melt 450 so that thermoplastic material is able to combine with the fibers. Thus, an impregnation die, for example, may provide a mechanism to "wet out" fiber reinforcement material with thermoplastic material in an embodiment. As fiber/thermoplastic material 490 exits die 430, it may be cooled, and wound onto spools 480 via 470 and 490, for example.

A uni-directional, fiber reinforced thermoplastic sheet, for example, may be produced in such as manner and may typically have a thickness range of from about 0.16 mm to about 0.6 mm, as an example. Thus, as one non-limiting illustration, a number of continuous fiber reinforced sheets are made by this method and range in thickness from about 0.15 mm to about 0.30 mm. A composite sheet typically may be about 1000 mm wide, for example. However, as shall be described below, a fiber reinforced thermoplastic sheet may be replaced with a panel comprising two composite polymer sheets, in an embodiment. Thus, for example, a sheet to be included in panel may comprise a thinner sheet, such as, in an embodiment, a composite polymer sheet, produced from a process similar to as described above, having a thickness in the range of from about 0.08 mm to about 0.3 mm. An illustrative embodiment, as an example, may employ a thickness in the range from about 0.09 mm to 0.25 mm, for example, with a typical thickness of about 0.125 mm and an areal weight of about 185 grams per square meter for roughly 60% glass fiber by weight in a polypropylene thermoplastic matrix. Table 1 below provides common areal weights for uni-directional, fiber reinforced thermoplastic sheets according to thermoplastic matrix type.

TABLE 1

Uni-Directional, Fiber Reinforced Thermoplastic Sheets Areal Weights

| Matrix Resin | Fiber Reinforcement | Thickness (mm) | Weight (grams/m$^2$) |
| --- | --- | --- | --- |
| PET | Glass | 0.125 | 239 |
| PA6 | Glass | 0.125 | 213 |
| PC/ABS | Glass | 0.125 | 213 |
| Polypropylene | Glass | 0.125 | 185 |
| HDPE | Glass | 0.125 | 174 |
| PET | Carbon | 0.125 | 195 |
| PA6 | Carbon | 0.125 | 181 |
| PC/ABS | Carbon | 0.125 | 178 |
| Polypropylene | Carbon | 0.125 | 139 |

Composite material may be wound onto rolls for convenience with respect to further manufacturing to be performed. Of course, claimed subject matter is not intended to be limited to illustrative examples, such as the foregoing.

Without intending to be exhaustive, other methods are also available to manufacture composite sheets, such as using high pressure laminates. For example, thermoplastic films may be placed on either side of a fiber reinforcement material. The combination may be subjected to heat and/or pressure to produce melting of the matrix material onto and through the fiber reinforcement material. In yet another example method, co-mingled fiber/thermoplastic rovings may be heated, spread, cooled and wound onto a spool. Thus, as suggested, a variety of approaches are possible and claimed subject matter is not intended to be limited to a particular approach or method.

In an illustrative embodiment, claimed subject matter, for example, may comprise a fiber reinforced polymer composite panel to be used in standard vacuum forming equipment to produce three dimensional composite parts with material properties approaching those of a part made from a polymer composite panel constructed from multiple uni-directional, continuous fiber reinforced polymer composite sheets. Thus, in an illustrative, but non-limiting embodiment, a panel may comprise at least two sheets of uni-directional fiber reinforced polymer sheets in which the fiber comprises continuous fiber but for a pattern of slits made in the polymer sheets to slice the fiber into discontinuous fiber strands. For example, uni-directional, fiber reinforced polymer (e.g., thermoplastic) composite sheets, such as example embodiment 1510, as shown in a plan lay out in FIG. 1, may be supplied by companies such as: Polystrand, Inc., (at Englewood, Colo.), Koninklijke Ten Cate nv (TenCate), (at Almelo, The Netherlands), Celanese Corporation (at Irving, Tex.), and Lanxess Corporation (at Pittsburgh, Pa.).

Figure 2A:
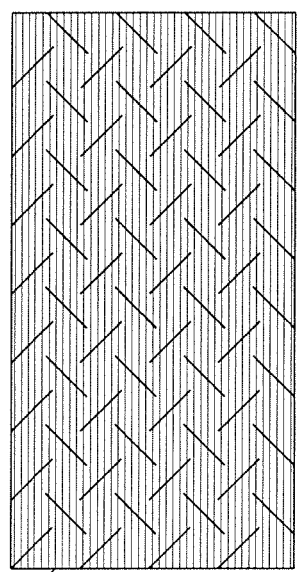
FIGS. 2A and 2B are illustrations, shown in plan view, of two respective embodiments of a sheet of discontinuous fiber reinforced composite material in plan view.
Figure 2B:
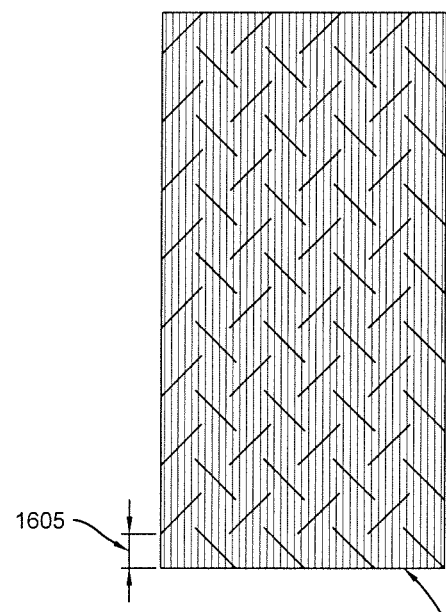

For an example embodiment in which a panel comprises a pair of sheets, a thickness between about 0.05 mm and about 0.5 mm, for example, may provide desirable results. For example, a thickness of about 0.25 mm may be used for an embodiment of a panel comprising two sheets of thickness 0.125 mm. However, it is, again, noted that claimed subject matter is not intended to be limited to illustrative examples, such as the foregoing. However, continuing with an illustrative embodiment, at least two polymer sheets, such as 1610 and 1620, having uni-directional fibers in which the respective sheets have a pattern of slits, as shown in FIG. 2, may be placed mutually adjacent, as shown further in FIG. 3. Slits may be made to slice continuous fibers of respective sheets into discontinuous fiber strands, as shall be described. Furthermore, as illustrated in FIG. 3, by sheets 1710 and 1720 being mutually adjacent, for an example embodiment, a panel 1730 may be formed.

In an embodiment, as shown by FIG. 4, with panel embodiment 1810, a substantially similar slit pattern may be employed for sheets that are mutually and immediately adjacent (e.g., forming a sheet pair). For example, in an embodiment in which adjacent sheets are substantially the same size, if adjacent sheets are arranged to have substantially coincident edges, then a slit pattern may be substantially the same but for an offset substantially along the direction of the fibers (e.g., a vertical offset) so that slit locations are not perfectly aligned for mutually adjacent, physically contacting sheets in a pair, again, shown by 1810, also shown in more detail, and discussed in more detail below. For example, vertical offset 1805, which corresponds to vertical offset 1605 for 1620 of FIG. 2, shows an amount of vertical translation of a pattern of slits on sheet 1610 so as to form a substantially similar slit pattern on sheet 1620. As an illustrative example, a vertical offset may be in the range from about 10 mm to about 40 mm. However, separation or distance between slits for an adjacent sheet of a panel may be a factor. Thus, for example, for an illustrative embodiment, a range of from about 25% to about 75% of the slit separation of an adjacent panel sheet may be employed.

Thus, in an example embodiment, for a panel, discontinuous-fiber-reinforced polymer sheets may be in physical contact, for example. A first polymer sheet of two sheets of a pair, for example may comprise substantially parallel fibers embedded in the sheet, the fibers being oriented in a direction substantially parallel to sheet vertical edges. Fibers, again, may be otherwise continuous but for a pattern of slits that result in discontinuous strands of embedded fibers.

For example, FIG. 5 illustrates a pattern of slits for an example embodiment sheet 110. A pattern of slits may, for example, comprise adjacent vertical columns of slits, the columns extending from one vertical edge of a polymer sheet to the other vertical edge of a polymer sheet, as shown in FIG. 5.

Likewise, slits of any particular column, such as slits 130, for example, may be mutually substantially aligned within the particular column. Likewise, any particular column of slits may overlap to a limited extent with any immediately adjacent neighboring column of slits, which may be seen more easily in the details of FIG. 6 by slits 220 and 230, for example (and discussed below in more detail). Although claimed subject matter is not restricted to a particular scale, FIG. 5 illustrates sheet 110 as being 15.00 inches horizontally across, whereas FIG. 6 illustrates the lower left corner of 110 in greater detail and depicts a 1.00 by 1.00 inch square area sub-portion.

Of course, a variety of patterns of slits are possible. It is not intended to limit claimed subject matter to embodiments provided for illustration, such as FIG. 5, as an example. As an example, slits in an immediately adjacent, neighboring column may be inclined at virtually any angle. Thus, for example, an immediately adjacent, neighboring column does not necessarily need to comprise a supplementary angle, although FIG. 5 illustrates an embodiment employing supplementary angles, described in more detail below.

Figure 20A:
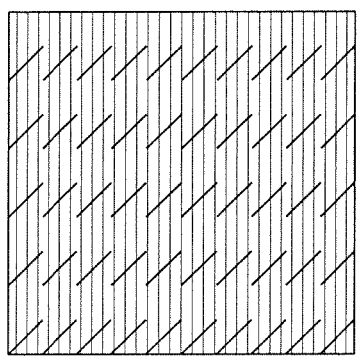
FIGS. 20A and 20B are illustrations of another embodiment of a panel of composite sheets.
Figure 20B:
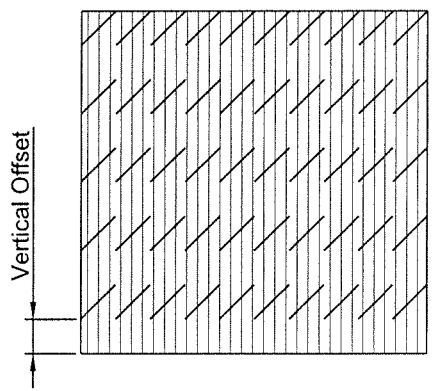

However, an approach, such as the embodiment of FIG. 5, may potentially provide a more uniform surface appearance and/or potentially result in more uniform stretching during thermoforming. But, as simply another illustrative example, an immediately adjacent, neighboring column of slits could also comprise slits having substantially the same slit angle, illustrated, for example, in FIG. 20.

As mentioned, in an embodiment, an immediately adjacent, neighboring column may employ slits at any angle. However, typically, slits of a particular column may comprise substantially aligned slits. As described in more detail below, also, typically, an overlap between columns of slits is desirable so that continuous fibers are sliced into discontinuous strands. Also typically, it may be desirable for an adjacent sheet to be offset, also described in more detail below.

Figures 7A, 7B:
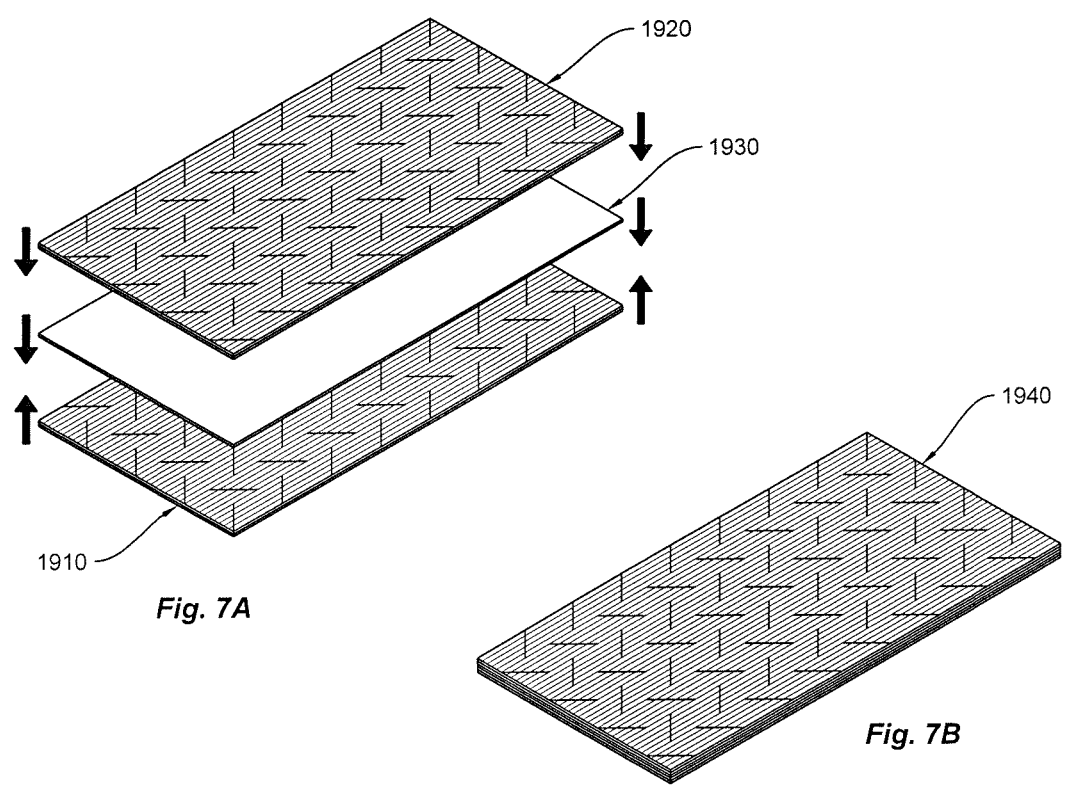
FIGS. 7A and 7B are illustrations, shown in isometric view, of another embodiment of a panel of composite sheets.
Figure 12:
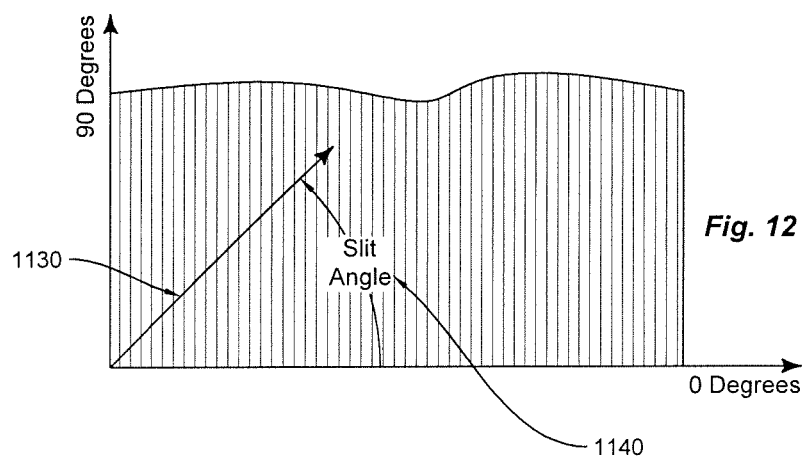
FIGS. 12-15 illustrates slit angle, slit length, distance or separation between slits, overlap of immediately adjacent neighboring columns of slits for an embodiment of a discontinuous fiber reinforced polymer sheet.

Thus, continuing, similar to FIG. 5, as previously described, for an embodiment, now referring to FIGS. 6 and 7, for any two immediately adjacent neighboring columns, slits of one of the two columns may be substantially oriented at an oblique angle relative to a horizontal direction substantially perpendicular to the direction of the fibers and slits of the other of the two columns may be substantially oriented at an angle comprising a 180 degree supplement thereto (e.g., supplementary angles). For example, in FIG. 6, slit 220 is substantially oriented at an oblique angle relative to a horizontal, assuming a right hand rotation rule (e.g., counter-clock wise). This angular orientation is illustrated more clearly in FIG. 12, by slit angle 1140 for slit 1130.

Referring again to FIG. 6, if slit 220 is considered to be in one of two immediately adjacent, neighboring columns, for example, slit 250 may be considered to be in the other of two immediately adjacent, neighboring columns. Slit 250, likewise, as shown, is substantially oriented at an angle comprising a 180 degree supplement to the angle of slit 220 in an embodiment.

Figure 13:
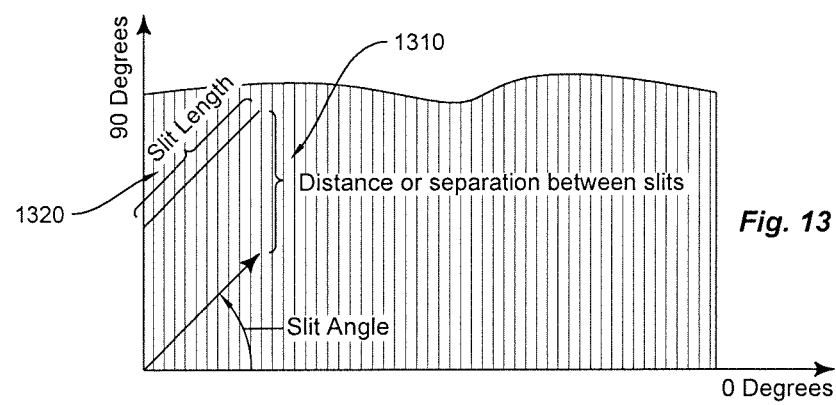

Furthermore, in an example embodiment, for any particular column of substantially aligned slits, the substantially aligned slits of the particular column may be consistently separated a corresponding distance apart and the substantially aligned slits of the column may have a correspondingly consistent length, also illustrated by the sheet embodiment of FIG. 5. For example, referring to FIG. 13, reference numeral 1310 points to a separation or distance that would be correspondingly consistent between slits in a column if more slits were illustrated (as shown in FIG. 5, for example) and reference numeral 1320 points to a correspondingly consistent slit length.

A pattern of slits may be formed in a polymer sheet of uni-directional continuous fibers, such as described previously, for example, so as to form discontinuous fiber strands embedded in the polymer sheet having particular lengths and having fiber strand endpoints particularly positioned related to endpoints of other fiber strands. One example pattern, as previously suggested, is shown in FIG. 5. However, as previously explained, FIG. 5 is a non-limiting illustration. Thus, various slit features, such as slit angle, distance (e.g. separation) between slits of a column and/or slit length, as examples, may vary in different embodiments. As one example, an oblique slit angle can vary from about 10 degrees to about 80 degrees. Typical ranges for an illustrative embodiment might be, for example, from about 30 degrees to about 79 degrees. In an embodiment, as suggested previously, two polymer sheets may be joined to comprise a sheet pair forming a panel. One embodiment, for example, is illustrated in FIG. 4.

Figure 8:
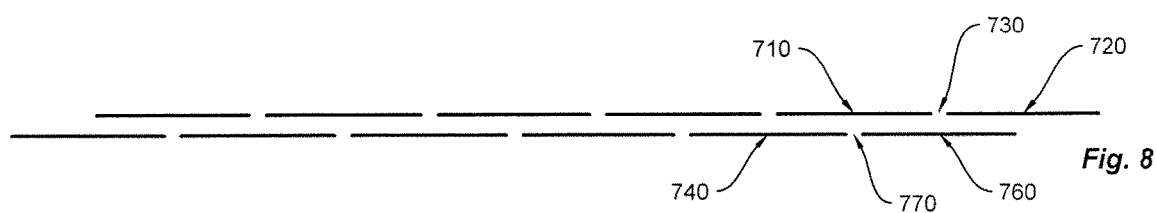
FIGS. 8-11 are a side view of a panel looking from plane A as shown in FIG. 19.
Figure 19:
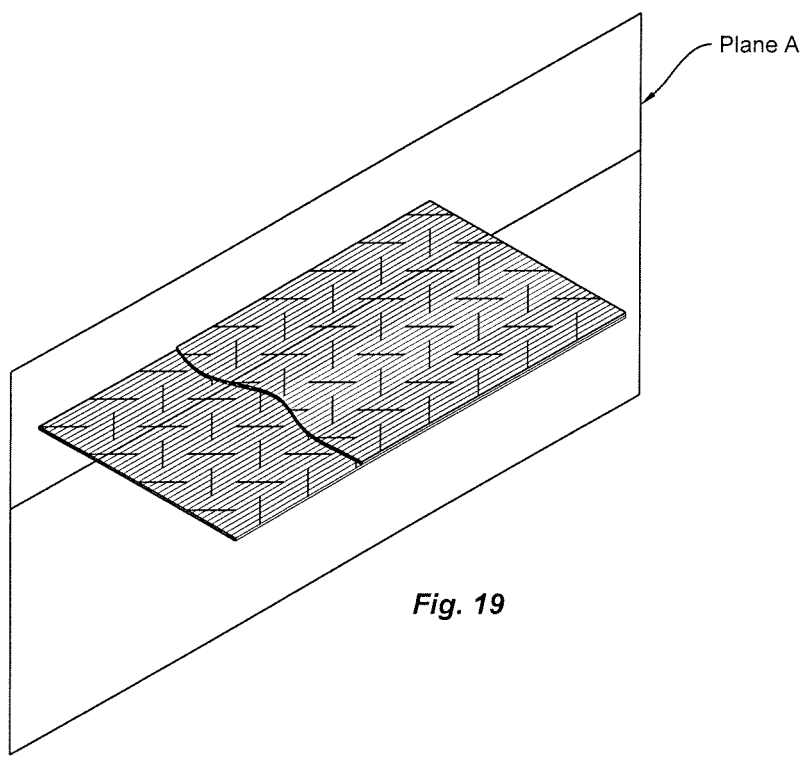
FIG. 19 is an illustration of an embodiment of a panel of composite sheets in which a plane dissects the panel along two substantially coincident fibers of the composite sheets.

In an embodiment, for example, referring to FIG. 19, if a plane A were to cut a panel along the direction of two substantially coincident fibers (e.g., both laying substantially in plane A), FIG. 8 illustrates a view looking into the cut panel from the plane (with some slight exaggeration for emphasis). FIG. 8 shows an embodiment after slits have been made. For example, reference numerals 770 and 730 point to breaks in respective fibers corresponding to slits in respective sheets of the example panel. Likewise, fiber strands 710 and 720 are portions of one otherwise continuous fiber (corresponding to break 730) and fiber strands 740 and 760 are portions of another otherwise continuous fiber (corresponding to break 770). Otherwise continuous, here, meaning that the fibers would be continuous but for the presence of slits. As suggested, in this illustrative example, the two otherwise continuous fibers both lay in the plane cutting the panel of FIG. 19.

Figure 9:
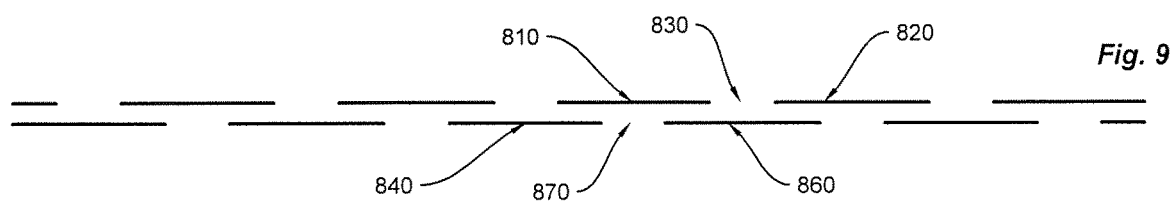
Figure 10:
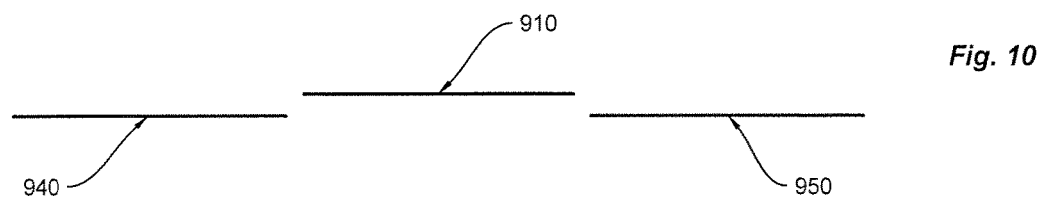
Figure 11:
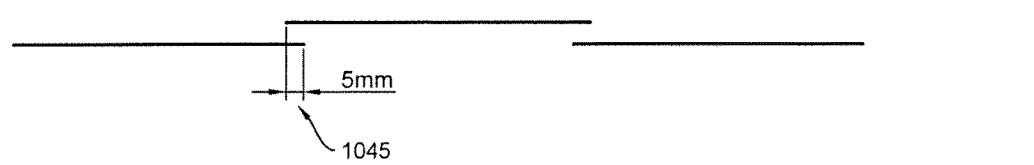

FIG. 9 illustrates a similar view as FIG. 8 with some stretching as may occur from vacuum forming, for example. As shown, breaks in FIG. 8 may potentially form wider gaps at respective slit locations as a result of stretching. However, as also shown in an example embodiment, fiber strands in a neighboring, immediately adjacent sheet, are potentially able to bridge corresponding gaps (e.g., openings). For example, fiber strand 860 potentially bridges opening or gap 830. Likewise, fiber strand 810 potentially bridges gap 870. As shown in FIG. 9, in an embodiment, fiber strands may be formed in positions relative to slits of an adjacent sheet for a panel so as to potentially distribute an applied load, for example, to thereby at least facilitate maintaining or possibly even increasing mechanical strength of a part to be fabricated. However, as suggested by FIG. 10, it is desirable to not stretch a panel to a point so that fiber strands potentially might not as effectively distribute a load, such as if a sheet is stretched to a point that a fiber strand of an adjacent sheet may not be sufficient to bridge ends of two fiber strands, as shown for example in FIG. 10. For example, fiber strand 910 is not long enough to bridge the ends of fiber strands 940 and 950. Consistent with such an approach, in an embodiment, stretching may, during vacuum forming, be such that an overlap of at least about 5 mm, for example, remains, as illustrated for example, by 1045 in FIG. 11.

A variety of slit patterns may be generated with potential beneficial effect. One attribute mentioned previously for an example embodiment relates to, for a pair of polymer sheets of a panel, offset, but otherwise substantially aligned, slits in respective polymer sheets, as shown, for example, by 1805 in FIGS. 4 and 1605 in FIG. 2. Furthermore, referring again to an example embodiment, such as FIG. 5, in the example shown, slits of immediately adjacent, neighboring columns of a particular polymer sheet are arranged in a manner so that slits are not aligned horizontally. This is illustrated in more detail, for example, in FIG. 14, in which an end B of slit 1230 is positioned to be roughly about half-way between respective ends C and D of slits 1240 and 1220, for example. Thus, in this example embodiment, slit 1230 is positioned approximately near a center point between the least remote ends of slits 1240 and 1220, respectively, of an immediately adjacent neighboring column (other column slits shown in FIG. 5, for example, have ends similarly positioned, as further examples). A benefit of slits of immediately adjacent, neighboring columns not being horizontally aligned is so that a "zigzag" of slits does not horizontally cross a sheet.

Thus, in an embodiment, sheets are more easily handle-able in that the sheets do not fall apart.

Again, a variety of potential patterns may be available to potentially facilitate distributing a load across fiber strands embedded in a sheet or panel. Nonetheless, with such an understanding, features of an example embodiment of a pattern of slits are now described in detail for illustrative purposes. For convenience, but without intending to limit claimed subject matter, the following parameters may be employed to describe an example embodiment:

1. slit length (e.g., reference numeral 1320 of FIG. 13) may affect a capability of a fiber strand to move during vacuum forming, for example, to allow a matrix material to substantially conform to a tool surface by stretching; a slit length less than 2 mm may not be desirable since this might affect column overlap; slit length may comprise a reasonably wide range, such as typically between from as short as below 15 mm to as long as above 100 mm. In an illustrative embodiment, for example, from about 15 mm to about 25 mm, for example, may comprise a length to conveniently position slit patterns for adjacent sheets. However, likewise, an embodiment may employ from about 35 mm to about 106 mm, as another example.
2. slit angle in these examples is shown relative to a direction substantially perpendicular to fiber direction using a right hand (e.g., counter-clockwise) rotation (e.g., reference numeral 1140 of FIG. 12); slit angle may influence cutting speed and/or surface aesthetics; for example, deviating from an angle of zero increases the number of columns and, hence, cutting time, since additional columns of slits would be cut to substantially cover a sheet; a 45 degree angle, for example, may increase cutting time by about 40%; additionally, it has been found that slit angle may influence surface aesthetics; a slit angle around above 60 degrees to below 80 degrees provides acceptable aesthetics, but may increase cutting time several times over; thus, in one possible embodiment, a 45 degree angle may present a compromise.
3. distance (e.g., separation) between slits in a column of slits (e.g., reference numeral 1310 of FIG. 13) may influence substantial conformability of material to a mold surface and/or affect potential expansion length (e.g., stretching of a sheet); smaller fiber lengths may enhance conformability and/or may improve quality of compound curves; a recommended range, for example, may comprise from about 25 mm to about 75 mm; wrinkles may become noticeable for compound curved surfaces for fiber lengths longer than 60 mm; typically, a 40 mm fiber length shows less wrinkling than 60 mm, and, typically, a 20 mm fiber length makes wrinkling barely noticeable; however, fiber strand length may also affect slit density which may potentially affect cutting time, as described previously in connection with slit length; in an illustrative embodiment, a distance or slit separation from about 20 mm to about 40 mm may be employed to produce acceptable quality thermoplastic composite parts that substantially conform to a tool surface without perceptible wrinkles; this fiber strand length also may also be convenient for slit pattern matching to an adjacent sheet and may provide a workable amount of column overlap, as described previously and as discussed below in item 4; this length may also be suitable for 48"×96" (1.22 m×2.44 m) sheets, which comprises a commonly supplied sheet size for thermoforming; nonetheless, there may be situations for larger parts (e.g., greater than one square meter) with gentle compound surfaces in which longer fiber strand lengths may be desirable; for larger parts, as an example, a fiber length on the order of from about 100 mm to about 150 mm may be desirable.
4. overlap between neighboring, immediately adjacent, columns was described previously (e.g., reference numeral 1210 of FIG. 14), and may, for example, be in the range from about 2 mm to about 5 mm, for an illustrative embodiment.

Figure 14:
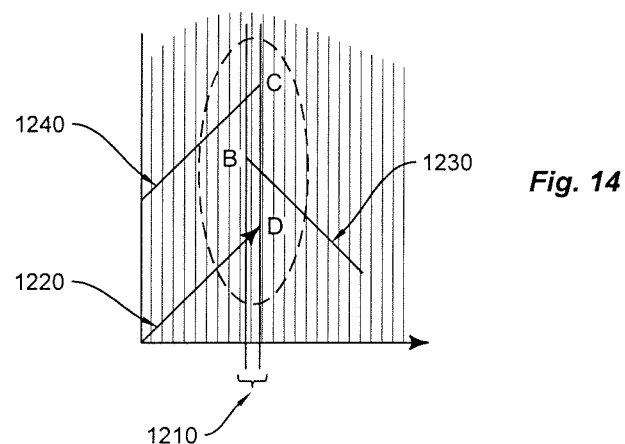

In an embodiment, slits may be made in a pattern comprising one or more adjacent vertical columns. As mentioned, slits may be described without loss of generality, for an embodiment, by the terms slit length, slit angle, and/or distance between slits. Likewise, in an example embodiment, slits in a column may be substantially aligned (e.g., parallel). Furthermore, for an embodiment, for immediately adjacent, neighboring, columns, slits in a right side column are located within a right edge of an immediately adjacent, neighboring, left side column by an overlap distance so that cutting of continuous fibers by slits takes place even for fibers located at or near the edges of adjacent columns. For example, an overlap is illustrated in FIG. 14 with reference numeral 1210. For example, an overlap may comprise from about 0.5 mm to about 10 mm with a typical overlap of about 2 mm. Likewise, an overlap may vary from column to column. More typically, however, a sheet may be substantially covered with similar vertical columns of slits. It is noted that without an overlap for adjacent columns, it might be possible to have uncut continuous fibers between adjacent columns, which may adversely affect fabrication during vacuum forming, for example.

Thus, from column to column, slit length, slit angle and/or distance (e.g., separation) between slits may, of course, be varied; however, for convenience of manufacturing, a substantially uniform pattern of consistent, substantially equal amounts, such as for slit length, slit angle and/or distance (e.g., separation) between slits, may be employed. Thus, oblique angles and their supplements (e.g., supplementary angles) may be substantially equal across columns. Distance or separation between slits of a column may be substantially equal across columns. Length of slits of a column may be substantially equal across columns. Further, for any two adjacent neighbor columns, slits of one column are not aligned horizontally relative to slits of its immediately adjacent, neighboring columns.

Figure 16:
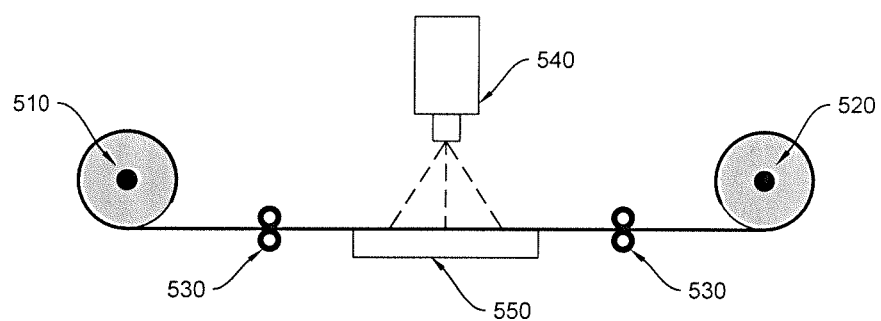
FIG. 16 is an illustration of an embodiment for fabricating an embodiment of a continuous fiber reinforced polymer sheet.

A variety of approaches to cutting a polymer sheet to form a pattern of slits may be employed with satisfactory results; however, two or three example illustrations are provided. For example, as described in more detail below, a knife blade, such as a rotary knife blade, or a laser, such as a CO2, laser may be used. As previously indicated, it is not intended that claimed subject matter be limited to illustrative embodiments. For example, composite polymer sheets may be available on spools, such as 510 and 520, from manufacturers, such as Polystrand, as one example, and may be placed on a holding fixture, such as shown in FIG. 16.

In an embodiment, a holding fixture 510 may, for example, accommodate spooled composite material, such as previously described. Likewise, a tensioning mechanism, such as guides 530, may allow for substantially consistent unwinding. For example, material may be fed through guides and a laser cutting bed, which may, for example, comprise a box with a thin honeycomb metal sheet inside that the laser does not slice or cut. Material may be fed through additional guides to a second spool to permit winding of material after being sliced substantially in accordance with a chosen pattern by electromagnetic energy emitted from the laser. For example, a spool form, as shown, may be implemented via mechanical pulling to unwind material from the first spool.

As material passes over laser bed 550, a CO2 laser, such as 540, for example, may be used to cut a slit pattern. A laser comprises one example approach that allows for simple, fast, and/or cost effective changing of a slit pattern, if desired, such as via programming directionality and/or position with respect to an emitted laser beam, for example. Likewise, some fiber reinforcement material may be abrasive for a knife cutting system. Nonetheless, alternately, a knife blade arrangement could be used, such as a rotary knife blade, as mentioned, to cut a slit pattern. Thus, a spool having a base slit pattern and a spool having an offset base pattern may be produced in such a manner, for example.

Figure 17:
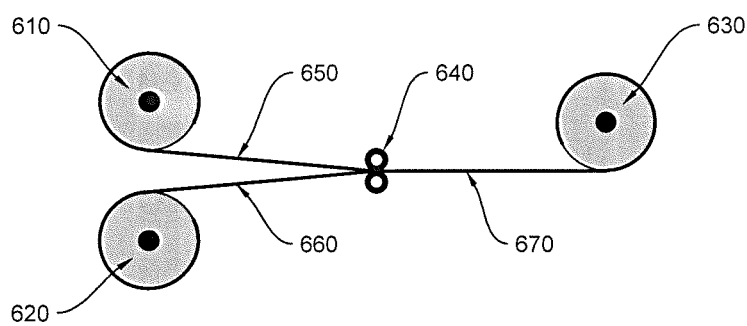
FIG. 17 is an illustration of an embodiment for fabricating an embodiment of a panel of composite sheets.

One example technique to join two sheets to form a panel is illustrated in FIG. 17. For example, if one spool of material, 610, has a pattern of slits (referred to here for convenience as a base pattern), such as may be made as described above, and if another spool of material, 620, has a substantially similar pattern of slits (referred to here for convenience as an offset pattern), such as one offset vertically, again, for example, made as previously described, a composite panel may be formed by feeding material of appropriately aligned patterns, such as 650 and 660, through heated rollers that may also apply pressure, for example. As a result of heat and pressure, in this example, a composite panel material 670 may be formed and wound onto spool 630, for example.

Alternatively, sheets may be cut to panel size and placed in physical contact substantially according to a desired orientation of fibers. Thus, in this example embodiment, to produce a panel, two sheets with slit patterns may be mutually adjacent with fibers running in substantially the same direction (e.g., for fiber reinforced polymer composite sheets). However, as discussed, one sheet may have a pattern of slits that is offset (e.g., relative to a sheet also having a pattern of slits), illustrated by various previously discussed embodiments, to thereby produce a panel, in another example embodiment.

Likewise, a panel, as an example, may comprise sheet pairs stacked in 0/90/0/90 degree orientations until a desired panel thickness is achieved, providing mechanical strength in substantially orthogonal directions as a result of cross orientation of reinforcing fibers. Nonetheless, sheet pairs may be stacked in any degree orientation (e.g., 0/0/0/0 . . . 0/+45/−45/0 . . . , etc.). Intended properties of a part being fabricated may influence how to orient sheet pairs relatively speaking, for example. Likewise, a chosen sequence of relatively oriented sheet pairs (e.g., in terms of degree rotation) may be repeated to achieve a desired panel thickness. For example, if a sheet pair has a thickness of 0.25 mm (2×0.125 mm), for a panel 2 mm thick, 8 sheet pairs may be stacked, such as in a degree orientation of 0/90/0/90/0/90/0/90, as an example.

A stack of sheet pairs, in an embodiment, may be placed on Caul plates, for example, such as, one caul plate on the bottom, and one on top. A "book" or "sandwich" formed may be placed on heated hydraulic presses, as shown for example by an embodiment depicted in FIG. 7. Press platens maybe heated to a desired temperature to melt a thermoplastic matrix material, for example. Pressure may also be used. For example, at an appropriate time, a press may be opened and the "book" or "sandwich" transferred to a secondary press to allow cooling in a manner to potentially beneficially affect rate of cooling (e.g., reduce warping, improve surface finish, result in predictable laminate properties to reduce de-lamination, etc.).

Thus, as discussed above, multiple "sheet pairs" may, for example, in an embodiment, be stacked in any relative angular orientation to fabricate a part, although, again, previously described are merely illustrative example embodiments. FIG. 7, for example, illustrates a pair 1910 and a pair 1920 with a sheet of polymer 1930, for example, inserted between. Thus, these may be joined to form panel 1940 in an embodiment, as shown. More specifically, a panel may comprise one pair or more than one pair in an embodiment, such as a stack.

Likewise, additional resin films, for example, may be placed as an outer surface of a stack of sheet pairs to improve surface finish, or may be interleaved between one or more sheet pairs of a stack for a variety of reasons, such as described with respect to FIG. 7, above, including to potentially facilitate at least partially filling gaps or openings that might be produced during thermoforming, for example.

In an embodiment, a panel, having been manufactured, may be used in a standard vacuum forming machine to produce a three dimensional composite part with properties close to properties of a part made from continuous fiber reinforced laminates. For example, it may be the case that by cutting a pattern of slits in uni-directional sheets, and employing an offset alignment between two adjacent sheets, in an example embodiment, a polymer sheet of discontinuous reinforcing fibers is able to stretch during vacuum forming, but 'openings' created at slit locations may potentially be bridged during vacuum forming, for example, by discontinuous reinforcing fibers of an adjacent sheet, in an embodiment. A discontinuous fiber of an immediately adjacent, neighboring sheet, for example, may potentially, in a fabricated part, assist with distributing a load across an associated 'opening,' for example.

In an example embodiment, a method of forming a composite part may comprise the following. A discontinuous fiber reinforced composite panel may be heated to a temperature so that a panel becomes pliable. A vacuum may be formed so that the heated panel stretches so as to substantially conform to a mold having a shape that includes compound curves. In this context, the term compound curve refers to a curve having more than one geometric center. For example, for a three-dimensional shape, if a plane were to slice the shape in a manner substantially perpendicular to its surface, a curve formed at the intersection of the plane and the shape comprises a compound curve if that curve has more than one geometric center. The panel, after being shaped, may then be cooled. In another embodiment, in addition to heat, pressure may also be employed. Pressure may facilitate and/or improve the capability of the panel to conform, at least substantially to the shape of the mold. An applied pressure to a heated composite panel of 100 psi, for example, has been shown to produce a part with desired replication of a tool surface. Furthermore, pressure may also improve consolidation between sheet pairs for thicker panels.

It is noted that although a panel may be stretched to conform its shape, a reasonable limit on degree of stretching exists. For example, in an embodiment, before being stretched, discontinuous fiber strands embedded in a panel, typically are in reasonably close physical proximity and/or contact with other discontinuous fibers. For an embodiment, this was discussed previously in connection with FIG. 8. Thus, for an embodiment, it may be desirable to limit stretching so that nearly all discontinuous fibers in a panel in contact with another discontinuous fiber before stretching also remain in contact after stretching, for example, as illustrated in FIG. 9, discussed previously.

Figure 18:
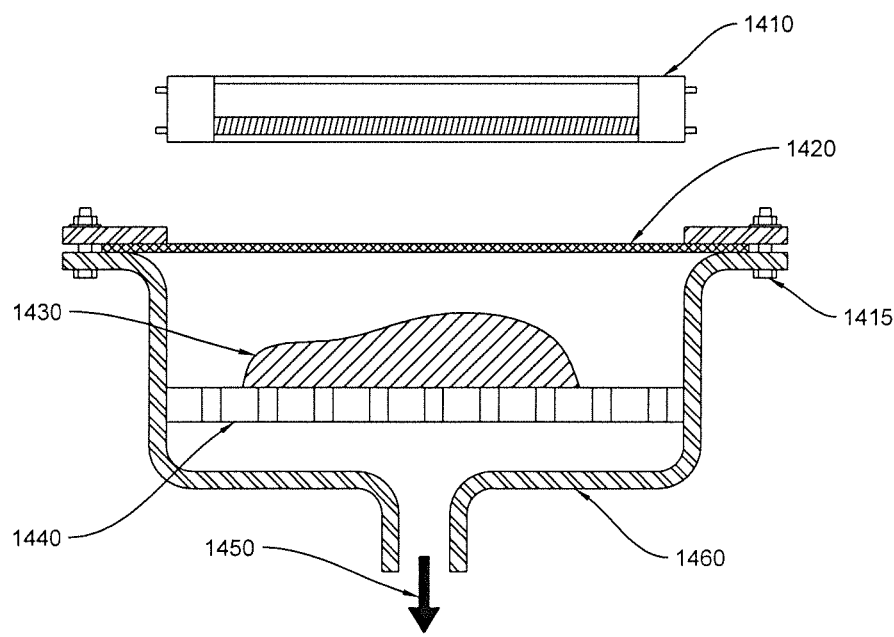
FIG. 18 is an illustration of an embodiment of a machine for use in thermoforming.

FIG. 18 illustrates an embodiment of a typical vacuum forming machine. A machine like this one may be employed for fabrication of a part using a composite material, such as a panel. Of course, this is merely one example illustration of a machine. Thus, other machine arrangements for vacuum forming, for example, are intended to be included within claimed subject matter.

Nonetheless, referring to FIG. 18, a panel, illustrated in FIG. 18 as thermoplastic 1420, may be clamped, such as via toggle clamps 1415, for example. Heater 1410 may heat panel 1420. It is noted that a heater may be sufficiently sophisticated to be able to program heating of different sections or zones to different temperatures at different times or at different rates of temperature change, for example. Eventually, an appropriate temperature (or appropriate temperatures for multiple zones) for forming a part may be reached.

Typically, a panel may therefore become pliable and able to fold onto a tool. Thus, heater 1410 may be adjusted away and a mold, such as 1430, may be moved into a position to receive the pliable material. Likewise, typically at a concurrent time, a vacuum may be initiated, illustrated by pump 1450. Thus, air may be sucked out from between mold 1430 of the tool and panel 1420 to permit the pliable panel to more tightly substantially conform to a shape provided by the mold 1430. It is noted that vent holes may permit air to be removed via the vacuum. Likewise, a reasonably quick process may be employed so that cooling does not result in stiffening of composite material too soon. However, after a pliable panel substantially conforms to a desired shape, cooling becomes desirable, so that the shape formed becomes reasonably stable. At an appropriate time, therefore, having acquired a shape, a resulting part may be removed from the tool, possibly for trimming and/or other types of finishing. For example, a fabricated part may have dimensions of the part are in the range of about 0.02 square meters to about 4.0 square meters, although claimed subject matter is not limited in scope in this respect.

In some situations, a combination of vacuum and pressure forming may be desirable. Thus, a positive pressure may be employed to press material against the tool surface. Thus, vacuum may be used to pull material to the tool surface and pressure may be used in combination to press the material to the tool surface.

Likewise, in other situations, compression molding may also be employed, for example. In a typical embodiment, a flat part may be cut from a composite sheet or panel to be heated to a melting temperature and placed on a compression tool, for example. The tool may close and press the material to a tool surface. After cooling, the tool may be opened and a molded part may be removed.

Although claimed subject matter is not limited to thermoplastic and/or thermoforming; nonetheless, thermoforming may provide some advantages, such as, for example, a capability to produce reasonably heavy parts (e.g., up to 125 Kg), a capability to manufacture reasonably large parts, (e.g., up to 4 square meters), an ability to provide flexible wall thickness (e.g., 1 mm to 16 mm), an improved cost effectiveness for small batch production due at least in part to comparatively low tooling cost, a reasonably low cost to make modifications to a part, and/or a capability to re-use material, such as through re-shaping. Some additional related aspects include: reduced weight, stability at room temperature, capability to reform shape, short cycle times, and less waste in terms of heat and/or scrap.

In general, a desire exists to fabricate composite parts at relatively low cost as a replacement for steel. Likewise, reducing cycle time for production of relatively large composite parts to less than 3 minutes is also desirable. Vacuum forming of panels may at least partially address these desires. Likewise, continuous fiber reinforced polymer composite materials offer a range of benefits for fabrication of lightweight parts; however, broad adoption of these materials may be constrained by a desire to manufacture complex parts (e.g., having compound curves). Alternatives, such as co-mingled fabrics and/or compression molding generally may not be adequate; either because wrinkles may result and/or because, to limit wrinkles, complex surfaces are a challenge to fabricate. However, reinforcement using discontinuous fiber strands may provide a potential approach to complex parts with sufficient strength, adequately reduced cycle time and a limited amount of wrinkling. Although claimed subject matter includes thermoset materials, it is also noted that thermoplastics may provide additional benefits, as alluded to above.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A composite panel comprising: two discontinuous-fiber-reinforced polymer sheets in physical contact;
   a first polymer sheet of the two polymer sheets comprising substantially parallel fibers embedded in the first polymer sheet, the fibers being oriented in a direction substantially parallel to vertical edges of the first polymer sheet, the fibers of the first polymer sheet being otherwise continuous but for a pattern of slits in the first polymer sheet that entirely penetrates the first polymer sheet and results in discontinuous strands of embedded fibers;
   the pattern of slits comprising adjacent columns of slits extending from one vertical edge of the first polymer sheet to the other vertical edge of the first polymer sheet;
   the slits of any particular column being mutually substantially aligned within the particular column; and
   the any particular column of the slits overlaps along a vertical direction to a limited extent with any immediately adjacent neighboring column of slits without having any slit intersections;
   wherein a second polymer sheet of the two polymer sheets has substantially the same pattern of slits as the first polymer sheet of the two polymer sheets with a vertical offset as a result of the sheet edges of the two polymer sheets being coincident;
   wherein the vertical offset is of an amount so that the slits of the two polymer sheets do not perfectly align and the slits of the two polymer sheets overlap to a limited extent such that the slits would have intersections but for being in separate polymer sheets.

2. The composite panel of claim 1, wherein, for respective polymer sheets of the two polymer sheets, the limited extent neighboring column overlap is in the range from about 2 mm to about 5 mm.

3. The composite panel of claim 1, wherein the thickness of respective polymer sheets of the two polymer sheets is in the range from about 0.08 mm to about 3 mm.

4. The composite panel of claim 1, wherein, for respective polymer sheets of the two polymer sheets, for any particular immediately adjacent neighboring columns, the slits are oriented substantially at an oblique angle in the range of from about 10 degrees to about 80 degrees relative to a horizontal direction substantially perpendicular to the direction of the fibers.

5. The composite panel of claim 1, wherein, for respective polymer sheets of the two polymer sheets, for any particular two immediately adjacent neighboring columns, the slits of one of the two columns are oriented substantially at an oblique angle relative to a horizontal direction substantially perpendicular to the direction of the fibers and the slits of the other of the two columns are oriented substantially at an angle comprising a 180 degree supplementary angle thereto.

6. The composite panel of claim 5, wherein, for respective polymer sheets of the two polymer sheets, for the any particular column of the mutually substantially aligned slits, the mutually substantially aligned slits of the any particular column are consistently spaced a corresponding distance apart and the mutually substantially aligned slits of the any particular column have a correspondingly consistent length.

7. The composite panel of claim 6, wherein, for respective polymer sheets of the two polymer sheets, the oblique angles are substantially equal across the adjacent columns.

8. The composite panel of claim 5, wherein, for respective polymer sheets of the two polymer sheets, the oblique angle is in the range from about 10 degrees to about 80 degrees.

9. The composite panel of claim 8, wherein, for respective polymer sheets of the two polymer sheets, the oblique angle comprises about 45 degrees.

10. The composite panel of claim 7, wherein, for respective polymer sheets of the two polymer sheets, the distance between the slits of the any particular column are substantially equal across the adjacent columns.

11. The composite panel of claim 6, wherein, for respective polymer sheets of the two polymer sheets, the distance between the slits of the any particular column is in the range from about 25 mm to about 75 mm.

12. The composite panel of claim 10, wherein, for respective polymer sheets of the two polymer sheets, the length of the slits of any particular column are substantially equal across the adjacent columns.

13. The composite panel of claim 6, wherein, for respective polymer sheets of the two polymer sheets, the length of the slits of the any particular column is in the range from about 35 mm to about 106 mm.

14. The composite panel of claim 12, wherein, for respective polymer sheets of the two polymer sheets, for the any particular two immediately adjacent neighboring columns, the slits of one column are not aligned horizontally relative to the slits of its neighboring column.

15. The composite panel of claim 1, wherein the vertical offset is in the range of from about 25% to about 75% of a consistently spaced corresponding distance apart for the slits in the any particular column of the mutually substantially aligned slits.

16. The composite panel of claim 1, wherein the fiber reinforcement of the two polymer sheets comprises at least one of the following: carbon, glass, aramid, or any combination thereof.

17. The composite panel of claim 1, wherein the two polymer sheets in physical contact comprise a pair and wherein the panel comprises a stack of pairs.

18. The composite panel of claim 17, wherein at least some of the pairs in the stack are oriented 90 degrees relative to a contacting immediately adjacent pair in the stack.

19. A method comprising: forming a pattern of slits in a polymer sheet of uni-directional continuous fibers that entirely penetrates the polymer sheet so as to form discontinuous fiber strands embedded in the polymer sheet having particular lengths and having fiber strand endpoints particularly positioned related to other fiber strands; and forming a substantially similar pattern of slits in another polymer sheet in order to produce a panel of two discontinuous-fiber-reinforced polymer sheets, wherein the substantially similar pattern of slits comprises substantially the same pattern with a vertical offset as a result of the edges of the two polymer sheets being coincident;

wherein the vertical offset is of an amount so that the slits of the two polymer sheets do not perfectly align and the slits of the two polymer sheets overlap to a limited extent such that the slits would have intersections but for being in separate polymer sheets.

20. The method of claim 19, wherein the slits are formed by a blade.

21. The method of claim 20, wherein the blade comprises a rotary blade.

22. The method of claim 19, wherein the slits are formed by a laser.

23. The method of claim 22, wherein the laser comprises a CO2 laser.

24. The method of claim 19, wherein the pattern of slits comprises vertical columns of slits extending from one vertical edge of the polymer sheet to the other vertical edge of the polymer sheet; the slits of any particular column being mutually substantially aligned within the any particular column; and wherein the slits in the any particular column have a consistent angle of orientation, a consistent length and a consistent distance to any neighboring slit within the any particular column.

25. A composition of matter comprising: a discontinuous-fiber-reinforced polymer sheet comprising substantially parallel fibers embedded in the sheet, wherein the fibers being oriented in a direction substantially parallel to vertical edges of the polymer sheet, the fibers being otherwise continuous but for a pattern of slits in the polymer sheet that entirely penetrate the polymer sheet and result in discontinuous strands of embedded fibers;

the pattern of slits comprising adjacent columns of slits extending from one vertical edge of the polymer sheet to the other vertical edge of the polymer sheet;

the slits of any particular column being mutually substantially aligned within the particular column; and the any particular column of slits overlaps along a vertical direction to a limited extent with any immediately adjacent neighboring column of slits without having any slit intersections; for any two immediately adjacent neighboring columns, the slits of one of the two columns are oriented substantially at an oblique angle relative to a horizontal direction substantially perpendicular to the direction of the fibers and the slits of the other of the two columns are oriented at substantially the same angle or at an angle comprising a 180 degree supplement thereto; for the any particular column of mutually substantially aligned slits, the mutually substantially aligned slits of the any particular column are consistently spaced a corresponding distance apart and the mutually substantially aligned slits of the any particular column have a correspondingly consistent length; and further comprising: a substantially similar pattern of slits in another polymer sheet in order to produce a panel of two discontinuous-fiber-reinforced polymer sheets, wherein the substantially similar pattern of slits comprises substantiallly the same pattern with a vertical offset as a result of the edges of the two polymer sheets being coincident;

wherein the vertical offset is of an amount so that the slits of the two polymer sheets do not perfectly align and the slits of the two polymer sheets overlap to a limited extent such that the slits would have intersections but for being in separate polymer sheets.

26. The composition of matter of claim 25, wherein, for respective polymer sheets of the two polymer sheets, the limited extent neighboring column overlap is in the range from about 2 mm to about 5 mm.

27. The composition of matter of claim 26, wherein the thickness of respective polymer sheets of the two polymer sheets is in the range from about 0.08 mm to about 0.3 mm.

28. The composition of matter of claim 26, wherein, for respective polymer sheets of the two polymer sheets, the oblique angle is in the range from about 10 degrees to about 80 degrees.

29. The composition of matter of claim 26, wherein, for respective polymer sheets of the two polymer sheets, the distance between the slits of any particular column is in the range from about 25 mm to about 75 mm.

30. The composition of matter of claim 26, wherein, for respective polymer sheets of the two polymer sheets, a matrix material of the respective polymer sheet comprises a thermoplastic and a fiber reinforcement material comprises carbon and/or e-glass.

* * * * *